(12) United States Patent
Tang et al.

(10) Patent No.: US 9,934,206 B2
(45) Date of Patent: Apr. 3, 2018

(54) METHOD AND APPARATUS FOR EXTRACTING WEB PAGE CONTENT

(71) Applicant: TENCENT TECHNOLOGY (SHENZHEN) COMPANY LIMITED, Shenzhen (CN)

(72) Inventors: Tingyong Tang, Shenzhen (CN); Yulei Liu, Shenzhen (CN); Wei Li, Shenzhen (CN); Xi Wang, Shenzhen (CN); Bo Hu, Shenzhen (CN); Kai Zhang, Shenzhen (CN); Bosen He, Shenzhen (CN); Ying Huang, Shenzhen (CN); Huijiao Yang, Shenzhen (CN); Zhengkai Xie, Shenzhen (CN); Zhipei Wang, Shenzhen (CN); Cheng Feng, Shenzhen (CN); Sirui Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 832 days.

(21) Appl. No.: 14/341,446

(22) Filed: Jul. 25, 2014

(65) Prior Publication Data
US 2014/0337699 A1 Nov. 13, 2014

Related U.S. Application Data

(63) Continuation of application No. PCT/CN2014/070562, filed on Jan. 14, 2014.

(30) Foreign Application Priority Data

Mar. 27, 2013 (CN) .......................... 2013 1 0101245

(51) Int. Cl.
| G06F 17/22 | (2006.01) |
| G06F 3/0484 | (2013.01) |
| G06F 3/0488 | (2013.01) |
| G06F 17/30 | (2006.01) |

(52) U.S. Cl.
CPC ........ *G06F 17/2247* (2013.01); *G06F 3/0488* (2013.01); *G06F 3/04842* (2013.01);
(Continued)

(58) Field of Classification Search
CPC ................................................ G06F 17/30905
See application file for complete search history.

(56) References Cited

U.S. PATENT DOCUMENTS

| 2008/0256120 A1* | 10/2008 | Kobayashi .............. G06F 17/24 |
| 2011/0119571 A1* | 5/2011 | Decker ............ G06F 17/30902 715/205 |
| 2012/0023461 A1* | 1/2012 | Blumenberg ....... G06F 3/04845 715/863 |

FOREIGN PATENT DOCUMENTS

| CN | 101408898 A | 4/2009 |
| CN | 10172746 A | 6/2010 |

(Continued)

OTHER PUBLICATIONS

Mary Lou, "CSS and JQuery Tutorial: Overlay with Slide Out Box", Dec. 3, 2009, retrieved from https://tympanus.net/codrops/2009/12/03/css-and-jquery-tutorial-overlay-with-slide-out-box/ on May 12, 2017.*

(Continued)

*Primary Examiner* — Cesar Paula
*Assistant Examiner* — Konrad Kulikowski
(74) *Attorney, Agent, or Firm* — Anova Law Group, PLLC (57) ABSTRACT

Methods and apparatus for extracting web page content are provided herein. An exemplary method can be implemented by a mobile terminal. A request command to open a first web page can be received. Whether a source code contains text content tags can be determined. When the source code corresponding to the first web page contains the text content tags, text content of the first web page enclosed within the (Continued)

50 kinds of common indoor plants | Reader | text content tags can be extracted by a reader. When the source code does not contain the text content tags, a start position and an end position to indicate the text content of the first web page can be identified in the source code. The text content tags can be respectively added after the start position and before the end position. The text content of the first web page enclosed within the text content tags can then be extracted.

19 Claims, 5 Drawing Sheets

(52) U.S. Cl.
CPC ...... *G06F 3/04847* (2013.01); *G06F 17/2235* (2013.01); *G06F 17/30905* (2013.01)

(56) References Cited

FOREIGN PATENT DOCUMENTS

| | | |
|---|---|---|
| CN | 101977233 A | 2/2011 |
| CN | 102270206 A | 12/2011 |
| CN | 102841900 A | 12/2012 |
| CN | 102929871 A | 2/2013 |
| CN | 102930031 A | 2/2013 |

OTHER PUBLICATIONS

The State Intellectual Property Office of the People's Republic of China (SIPO) Office Action for Application No. 201310101245.9 dated Apr. 24, 2017 pp. 1-10.

The World Intellectual Property Organization (WIPO) International Search Report for PCT/CN2014/070562 dated Apr. 3, 2014.

The State Intellectual Property Office of the People's Republic of China (SIPO), Office Action 2 for Application No. 201310101245.9, dated Feb. 5, 2018, 10 Pages (including translation).

Shaoning Zeng et al. "HTML5 for Masterminds: How to take advantage of HTML5 to create amazing websites and revolutionary applications", China Machine Press, Sep. 30, 2012, pp. 3, 13-16, 11 Pages (including abstract).

* cited by examiner

METHOD AND APPARATUS FOR EXTRACTING WEB PAGE CONTENT

CROSS-REFERENCES TO RELATED APPLICATIONS

This application is a continuation application of PCT Patent Application No. PCT/CN2014/070562, filed on Jan. 14, 2014, which claims priority to Chinese Patent Application No. 201310101245.9, filed on Mar. 27, 2013, the entire contents of all of which are incorporated herein by reference.

FIELD OF THE DISCLOSURE

The present disclosure generally relates to Internet technology and, more particularly, relates to methods and apparatus for extracting web page content.

BACKGROUND

With rapid development of mobile Internet technology, smart phones have become people's inseparable companion. When a smart phone is used for browsing a web page, a reader in a Safari browser can be used to extract text content of the web page for browsing the web page. Alternatively, an Evernote plug-in can be used to extract the text content of the web page for browsing the web page.

Specifically, when a user uses the Safari browser, the user clicks on a reader button displayed in an address bar to trigger the reader. The reader then extracts the text content of the web page and displays the extracted text content. When the Evernote plug-in is used for browsing the web page, the Evernote plug-in is installed in a Chrome browser first. During web page browsing, a plug-in button can be clicked such that the plug-in extracts the text content of the web page and displays the extracted text content.

However, when existing technology (e.g., the Safari browser) is used for web page browsing, web pages supported by the Safari browser are relatively less, and some web pages cannot be displayed or are not suitable to be displayed on mobile devices. As a result, web page browsing experience is affected. When the Evernote plug-in is used for web page browsing, the Evernote plug-in can extract or display the text content only when the Evernote plug-in can recognize the web page. Such operation is complicated, and whether the text content of the web page can be extracted cannot be smartly recognized and cannot smartly inform the user.

BRIEF SUMMARY OF THE DISCLOSURE

One aspect of the present disclosure includes a method for extracting web page content. The method can be implemented by a mobile terminal. In an exemplary method, a request command to open a first web page can be received. It can be determined whether a source code corresponding to the first web page contains text content tags. When the source code corresponding to the first web page is determined to contain the text content tags, text content of the first web page enclosed within the text content tags can be extracted by a reader. When the source code corresponding to the first web page is determined not to contain the text content tags, a start position and an end position to indicate the text content of the first web page can be identified in the source code. The text content tags can be respectively added after the start position and before the end position. The text content of the first web page enclosed within the text content tags can then be extracted.

Another aspect of the present disclosure includes an apparatus for extracting web page content. The apparatus can include a mobile terminal. The mobile terminal can include a determination unit, an extraction unit, an identification unit and an addition unit. The determination unit can be configured to, when a request command to open a first web page is received, determine whether a source code corresponding to the first web page contains text content tags. When the source code corresponding to the first web page is determined to contain the text content tags, the extraction unit can be configured to extract text content of the first web page enclosed within the text content tags by a reader. When the source code corresponding to the first web page is determined not to contain the text content tags, the identification unit can be configured to identify a start position and an end position to indicate the text content of the first web page in the source code. The addition unit can be configured to respectively add the text content tags after the start position and before the end position. The extraction unit can be configured to extract the text content of the first web page enclosed within the text content tags.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 7:
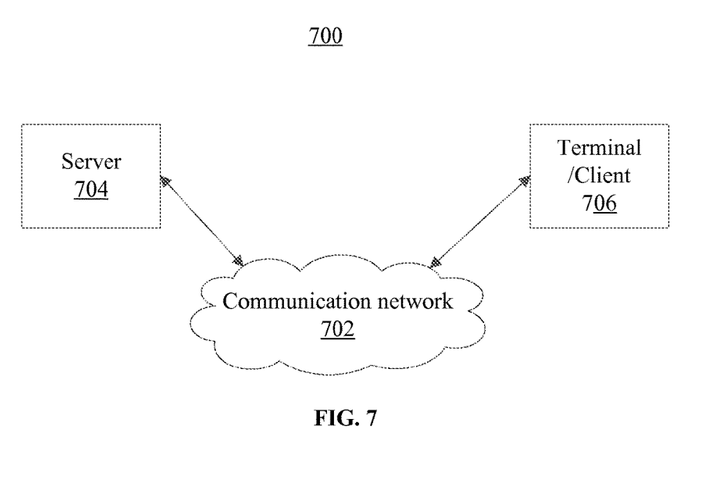
FIG. 7 depicts an exemplary environment incorporating certain disclosed embodiments.

FIG. 7 depicts an exemplary environment 700 incorporating exemplary methods and apparatus for extracting web page content in accordance with various disclosed embodiments. As shown in FIG. 7, the environment 700 can include a server 704, a terminal 706, and a communication network 702. The server 704 and the terminal 706 may be coupled through the communication network 702 for information exchange, e.g., web page browsing or other suitable information exchange events. Although only one terminal 706 and one server 704 are shown in the environment 700, any number of terminals 706 or servers 704 may be included, and other devices may also be included.

The communication network 702 may include any appropriate type of communication network for providing network connections to the server 704 and terminal 706 or among multiple servers 704 or terminals 706. For example, the communication network 702 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other client-side computing device.

A server, as used herein, may refer to one or more server computers configured to provide certain server functionalities, e.g., web page browsing. A server may also include one or more processors to execute computer programs in parallel.

Figure 8:
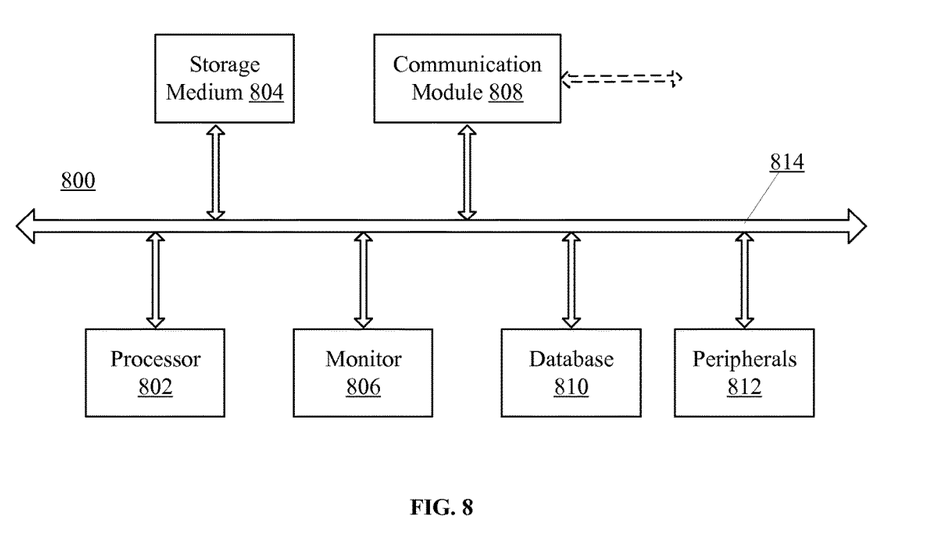
FIG. 8 depicts an exemplary computing system consistent with the disclosed embodiments.

The server 704 and the terminal 706 may be implemented on any appropriate computing platform. FIG. 8 shows a block diagram of an exemplary computing system 800 (or computer system 800) capable of implementing the server 704 and/or the terminal 706. As shown in FIG. 8, the exemplary computer system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The storage medium 804 may include memory modules, e.g., Read-Only Memory (ROM), Random Access Memory (RAM), and flash memory modules, and mass storages, e.g., CD-ROM, U-disk, removable hard disk, etc. The storage medium 804 may store computer programs for implementing various processes (e.g., web page browsing, processing source code of web pages, extracting web page content, etc.), when executed by the processor 802.

The monitor 806 may include display devices for displaying contents in the computing system 800, e.g., displaying web pages, displaying text content. In one embodiment, the monitor 806 can include a touch screen. User may interact with the computer system via the touch screen. The peripherals 812 may include I/O devices such as keyboard and mouse.

Further, the communication module 808 may include network devices for establishing connections through the communication network 702. The database 810 may include one or more databases for storing certain data and for performing certain operations on the stored data, e.g., storing reader program, browser program, text content, etc.

In operation, the terminal 706 may cause the server 704 to perform certain actions, e.g., transmitting a web page. The server 704 may be configured to provide structures and functions for such actions and operations. More particularly, in various embodiments, the server 704 can include a proxy server that has a self-learning function and uses a self-adaptive algorithm. The proxy server can constantly adjust to obtain increasingly accurate web page structural analysis, in order to enable the browser installed on the terminal 706 to quickly identify text content of a web page. The terminal 706 can be configured to use the proxy server.

In various embodiments, a terminal such as a mobile terminal involved in the disclosed methods and systems can include the terminal 706, while a server involved in the disclosed methods and systems can include the server 704. The methods and apparatus disclosed in accordance with various embodiments can be executed by a computer system.

Figure 1:
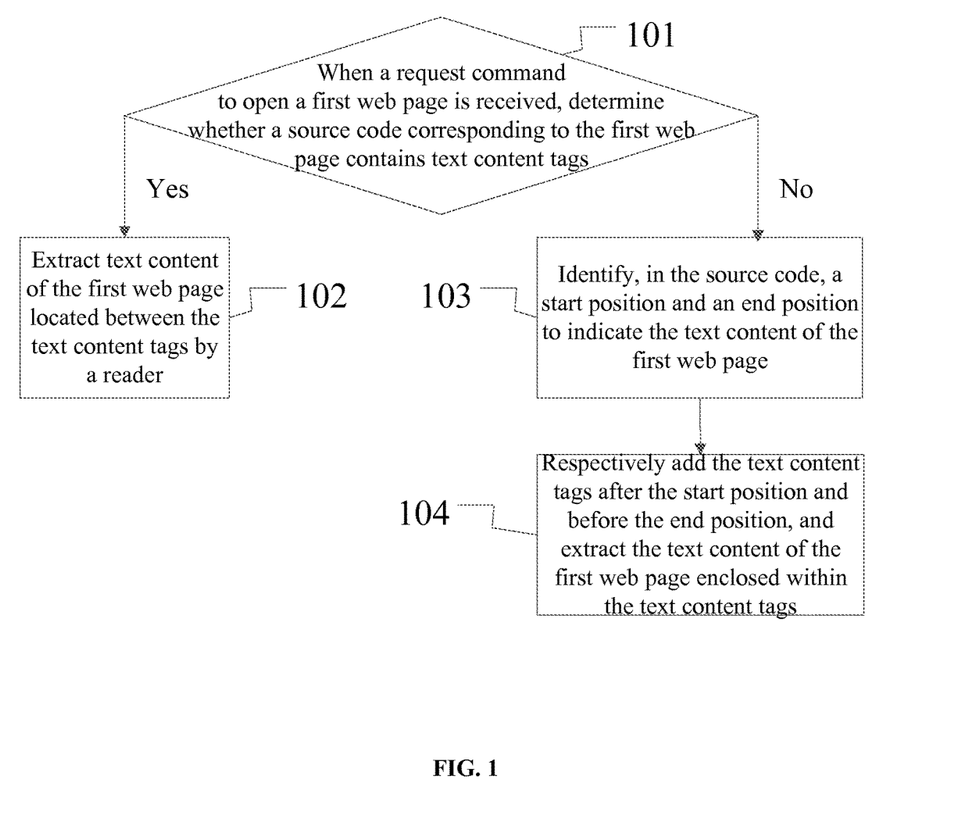
FIG. 1 depicts a flow diagram of an exemplary method for extracting web page content in accordance with various disclosed embodiments.

Various embodiments provide methods for extracting web page content. FIG. 1 depicts a flow diagram of an exemplary method for extracting web page content in accordance with various disclosed embodiments. The exemplary method can be implemented by a mobile terminal. A browser can be installed on the mobile terminal. The method can include the following exemplary steps.

In Step 101, a request command to open a first web page is received, and it is then determined whether a source code corresponding to the first web page contains text content tags therein. For example, a user can open the browser and input a web address to open the first web page, or directly open a web page (e.g. the first web page) in a browser home page. After receiving the request command to open the first web page, the browser can obtain a source code corresponding to the first web page. Next, a rendering engine of the browser can smartly determine (or recognize) whether the source code contains text content tags.

Optionally, the text content tags can include article tags. That is, the rendering engine can smartly determine whether the source code contains article tags. In one embodiment, according to the article tags, text content of the first web page can be extracted for displaying.

In various embodiments, a text content tag can include a tag that indicates existence and position of text content. The text content tag can include an article tag, or any other suitable tags, depending on the specific language for creating webpages. For illustrative purposes, in certain embodiments, a text content tag can be referred to as an article tag.

In various embodiments, article tags may appear as a pair, e.g., expressed in a form of <article></article>. Content enclosed within (e.g., located between) a pair of article tags can be the text content of the web page. It should be noted that the "first" as in "the first web page" is not for sorting purposes, but for the purposes of illustrating various different web pages.

In Step 102, when the source code corresponding to the first web page contains the text content tags, text content of the first web page enclosed within the text content tags is extracted using a reader. Optionally, when the source code corresponding to the first web page contains the text content tags, a reader button can be displayed in a browser address bar of the first web page. In various embodiments, on a top of a webpage display area (e.g., in the browser), when a web page is being opened, the user may usually pay attention to the browser address bar. The user may conveniently use a reader function (e.g., when the read button is displayed) to read text of the web page.

For example, at this moment, the user may click on the reader button. When the browser receives a request command to open a reader, the text content of the first web page can be extracted using the reader. The request command can be sent by the user when clicking on the reader button. The extracted text content of the first web page can be displayed on a second web page. In various embodiments, the reader may include any suitable reader program provided in the browser, without limitation. The reader can have a function of extracting the text content of the first web page between the text content tags when the source code corresponding to the first web page contains the text content tags.

In Step 103, when the source code corresponding to the first web page does not contain the text content tags, a start position and an end position to indicate the text content of the first web page are identified in the source code. When the source code corresponding to the first web page does not contain the text content tags, the reader button is not displayed. In this case, the user may not be able to read the text content of the first web page by clicking on the reader (i.e., the reader button). In one embodiment, by identifying, in the background of the browser, the start position and the end position of the text content of the first web page in the source code, the browser can further process the start position and the end position of the text content of the first web page, in order to extract the text content of the first web page.

Optionally, during the identifying of the start position of the text content of the first web page in the source code, the source code can include Hyper Text Mark-up Language (HTML) code. Thus, optionally, a title of the text content of the first web page is identified first. The title (or any other suitable tags) can be used as the start position of the text content. Next, the end position of the text content of the first web page is identified.

Optionally, content of each web site has certain characteristics. Developers of a web page can choose to use a particular structure to organize the content (e.g. of the web page, the web site, etc.). By analyzing the characteristics, the structure of the web page can be obtained. The start position and the end position of the content of the web page can thus be obtained accordingly. The browser in accordance with various disclosed embodiments can be configured to use a proxy server that has a self-learning function and uses a self-adaptive algorithm. The proxy server can be constantly adjusted to obtain increasingly accurate web page structural analysis, in order to quickly identify the start position and the end position of the text content.

In Step 104, the text content tags are respectively added after the start position and before the end position, and the text content of the first web page enclosed within (e.g., located between) the text content tags is extracted. For example, a text content tag, e.g., an article tag, can be added after (i.e., following) the start position (e.g., identified in Step 103), and can be added before the end position (e.g., identified in Step 103). Optionally, after the pair of article tags are respectively added after the start position and before the end position, the content enclosed within (i.e., located between) the pair of article tags can be extracted and displayed.

In various embodiments, a method for extracting web page content is provided. When source code corresponding to a first web page contains text content tags, a reader button can be displayed, and text content of the first web page can be read using a reader. When the source code corresponding to the first web page does not contain the text content tags, the text content tags can be added to the text content of the first web page. The text content of the first web page enclosed within the text content tags can be extracted. Thus, whether text content of a web page can be extracted can be smartly determined (i.e., recognized). The text content of the web page can be correctly extracted and displayed. Browsing experience of user(s) can thus be improved.

Figure 2:
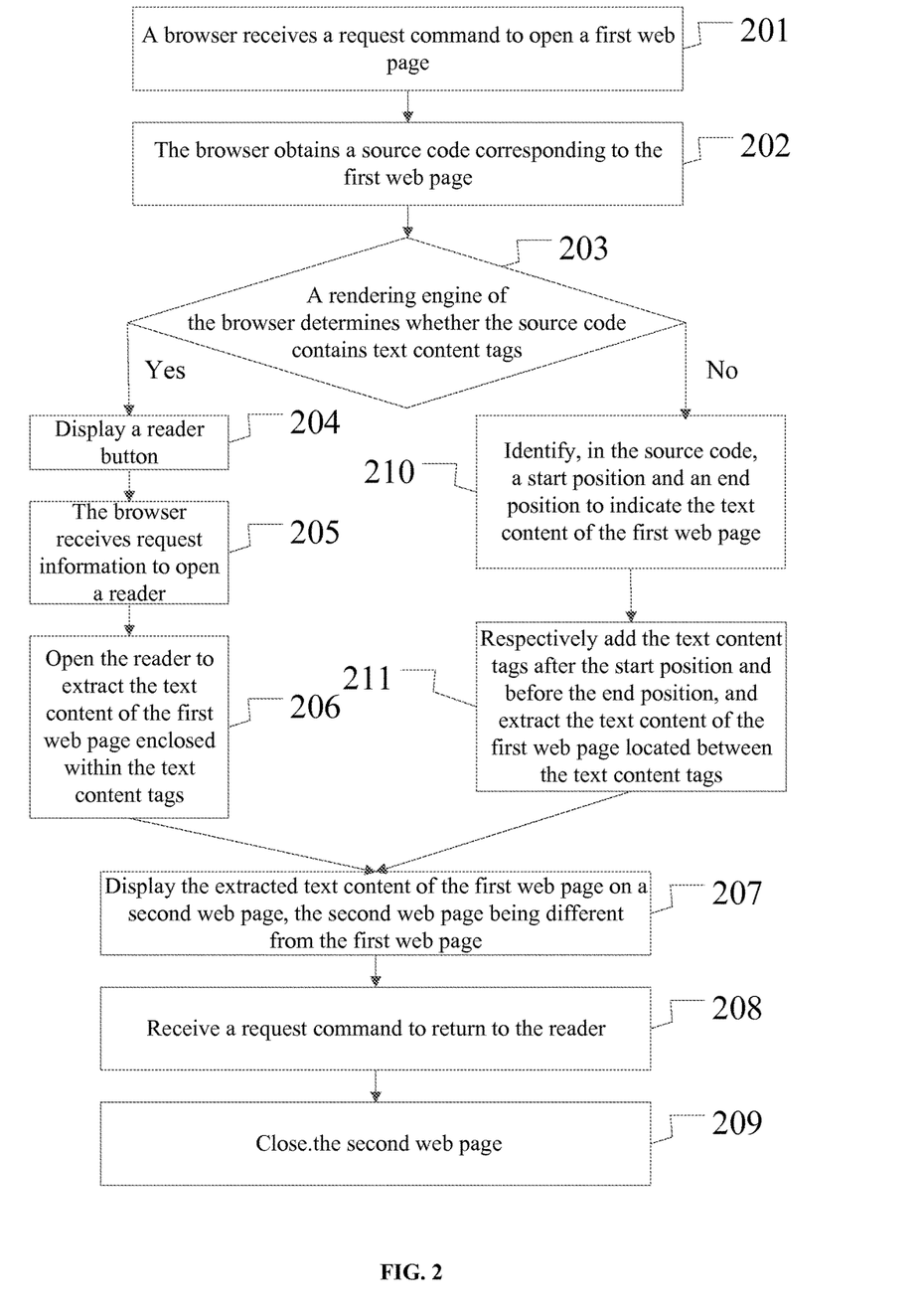
FIG. 2 depicts a flow diagram of another exemplary method for extracting web page content in accordance with various disclosed embodiments.

FIG. 2 depicts a flow diagram of another exemplary method for extracting web page content in accordance with various disclosed embodiments. The exemplary method can be implemented by a mobile terminal. A browser can be installed in the mobile terminal. The method can include the following exemplary steps.

In Step 201, the browser receives a request command to open a first web page. Optionally, a user can open the browser and input a web address to open the first web page, or directly open a web page, e.g., the first web page, in a browser home page.

In Step 202, the browser obtains a source code corresponding to the first web page. Optionally, the source code corresponding to the first web page can be obtained using a uniform resource locator (URL) address inputted by the user in an address bar of the browser. The source code corresponding to the first web page can also be obtained via the first web page that is directly opened. The source code corresponding to the first web page can also be obtained using any other suitable methods, without limitation.

In Step 203, a rendering engine of the browser determines whether the source code contains text content tags (e.g., article tags) therein. In this step, the rendering engine of the browser can smartly determine (i.e., recognize) whether the source code contains article tags therein. When it is determined that the source code corresponding to the first web page contains the article tags, Step 204 can be performed. When it is determined that the source code corresponding to the first web page does not contain the article tags, Step 210 can be performed.

In various embodiments, text content can be extracted according to the article tags in the source code, in order to ensure that the browser can extract the text content from a web page that has text content. It should be noted that, text content of a web page can include a title of text content and the text content. In various embodiments, the text content does not include advertisements, videos, and/or other content that are not relevant to the text content of the web page.

In Step 204, when the source code corresponding to the first web page contains the text content tags, a reader button is displayed. It should be noted that, the reader button can be previously provided and configured. Thus, when the source code corresponding to the first web page contains the article tags, the reader button can be displayed.

Optionally, the reader button can be displayed in a browser address bar of the first web page. In various embodiments, on a top of a webpage display area (e.g., in the browser), when a web page is being opened, the user may usually pay attention to the browser address bar. The user may conveniently use a reader function (e.g., when the read button is displayed) to read text of the web page. That is, the reader button (i.e., reader icon) can be displayed after (i.e., following) the title of the text content of the first web page that the user needs to read. In various embodiments, when the title of the text content of the first web page contains relatively small amount of characters (or words), the title can be all displayed in the browser address bar. When the title of the text content of the first web page contains a large amount of characters, the first few characters can be displayed in the browser address bar, e.g., displaying about the first 10 characters, and remaining space in the browser address bar can be used for displaying the reader button.

Figure 3:
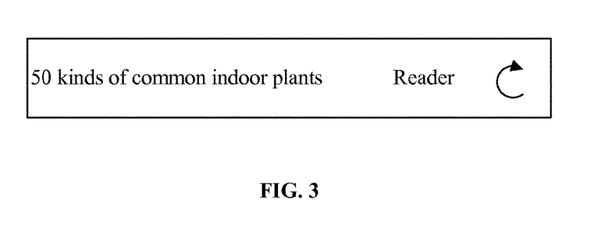
FIG. 3 depicts an exemplary reader icon in accordance with various disclosed embodiments.

The reader button can be set as various forms of identification. For example, FIG. 3 depicts an exemplary reader icon in accordance with various disclosed embodiments. A word "reader" (or three Chinese characters "阅读器", which means "reader") can be directly displayed. In one embodiment, the word "reader" can be displayed using a font that is different from the font of other displayed content, e.g., displayed using a bold font.

Figure 4:
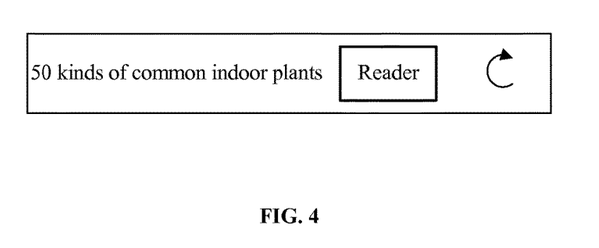
FIG. 4 depicts another exemplary reader icon in accordance with various disclosed embodiments.

FIG. 4 depicts another exemplary reader icon in accordance with various disclosed embodiments. In this case, the reader icon can be set as the word "reader" displayed in a bold box. The reader icon can also be displayed in any other suitable forms in order for the user to easily identify the reader.

In Step 205, the browser receives request information to open the reader. When the reader button is displayed on the first web page, it can indicate that the current web page (e.g., the first web page) can be read by the reader. The user may click on the reader button. The browser can receive the request information generated by the user via clicking on the reader button. The request information can include request information to open the reader. Next, the browser can perform further processes according to the request information, such that the user can browse the text content of the first web page using the reader.

In Step 206, the reader is opened. The title and the text content of the web page are extracted. Optionally, the browser can extract the current web page (e.g., the first web page). That is, the title and the text content of the first web page are extracted.

For example, when the title is being extracted, a title tag reference of the first web page can be obtained using a document object in an html specification. Next, an innerHTML method of the title tag can be called. The title of the first web page can thus be obtained.

For example, when the text content of the first web page is being extracted, an article tag reference of the first web page can be obtained using the document object in the html specification. Next, the innerHTML of the article tag can be called. The text content of the first web page can thus be obtained.

In one embodiment, after the title and the text content are extracted, the title and the text content can be inserted into a reader template page. After the insertion, the reader template page can be opened and loaded by the browser. The text content of the first web page can then be displayed. Next, Step 207 can be performed.

For example, the reader template page can include a standard html page locally saved in the browser. A structure of the reader template page can include a title portion and a text content portion. For example, the title portion can include <title>%title</title>. The text content portion can include <article>%content</article>. During the insertion of the title and the text content, %title can be replaced by the extracted title, and %content can be replaced by the extracted text content of the first web page.

In Step 207, the extracted text content of the first web page can be displayed on a second web page. In various embodiments, the second web page and the first web page can be different.

Optionally, when the text content of the first web page is displayed, another web page (e.g., the second web page) can be opened for displaying the text content. Thus, other content of the original first web page is not lost, and can easily be chosen for reading by the user. User experience can thus be improved.

Optionally, the second web page displaying the text content of the first web page can be slid upward from e.g., the bottom of the screen, the bottom of the first web page, the lower portion of the screen, etc. That is, a reader interface can be slid upward to display the second web page. The second web page can display the text content of the first web page. A toolbar can be displayed on a bottom of the second web page, e.g., a toolbar including an icon of changing font, an icon of sharing article content, and/or an icon of returning to the first web page.

For example, the mobile terminal can include a touch screen. In this case, when the user reads the text content on the second web page, the user can display other unread pages of the text content using a gesture by sliding upward on the touch screen.

In one embodiment, when the last page of the text content is displayed, a touch operation for continuously sliding the text content upward by the user can be detected. When it is detected that the user (e.g., a finger of the user) is off from the touch screen (e.g., after sliding upward), a first animation can be generated and displayed. The first animation can include an animation bounced back from releasing of a continuous upward pulling of the last page of the text content. Adding the first animation can enhance the user's interest in reading.

In Step 208, a request command to return to the reader is received. For example, after the user finishes reading the text content displayed on the second web page, the user can click on a back button. After the browser receives the request command generated by the user by clicking on the back button, the second web page can be closed to return to the first web page. In various embodiments, returning to the reader can include returning to any suitable interface that is previously displayed before opening the second web page. For example, the interface can include the first web page having the reader button displayed.

In Step 209, the second web page is closed. Optionally, the second web page can be slid downward into the first web page, e.g., from the top of the screen, from an upper portion of the screen, etc. The first web page can be displayed. The second web page can be closed.

In Step 210, when the source code corresponding to the first web page does not contain the text content tags, a start position and an end position to indicate the text content of the first web page are identified in the source code. For example, after Step 203 is performed, the rendering engine of the browser can determine that the source code does not contain the text content tags (e.g., the article tag). Thus, the reader button is not displayed. Accordingly, the text content of the first web page cannot be read via the reader. In this case, by identifying the start position and the end position to indicate the text content of the first web page, the text content can be further processed to extract the text content of the first web page.

Optionally, content of each web site has certain characteristics. Developers of a web page can choose to use a particular structure to organize the content (e.g., the content of the web page, the web site, etc.). By analyzing the characteristics, the structure of the web page can be obtained. The start position and the end position of the content of the web page can thus be obtained accordingly. The browser in accordance with various disclosed embodiments can be configured to use a proxy server that has a self-learning function and uses a self-adaptive algorithm. The proxy server can be constantly adjusted to obtain increasingly accurate web page structural analysis, in order to quickly identify the start position and the end position of the text content.

In Step 211, the text content tags are respectively added after the start position and before the end position, and the text content of the first web page enclosed within (i.e., located between) the text content tags is extracted. For example, according to the start position and the end position of the text content of the first web page identified (e.g., in Step 210), the text content tags can be added to the text content. The converted (or extracted) text content can be transmitted to the browser. Optionally, the text tags can include article tags.

For example, the article tags can be added to the text content. In various embodiments, article tags can appear in pairs. Thus, the article tags can be respectively added after the start position and before the end position, such that the text content of the first web page can be enclosed within the article tags, in order to facilitate the subsequent extraction of the text content of the first web page.

After the article tags are added to the text content, the text content enclosed within (i.e., located between) the article tags can be extracted. The extracted text content can thus include the text content of the first web page.

The extracting of the text content can be accomplished using various methods. In one example, after the start position and the end position are detected, and after the text content tags are added, a reader button can be displayed (e.g., as in Step 204). The text content can be extracted using the reader, and the user can open the reader to read the text content by performing similar or the same methods as depicted in Steps 204-209.

In another example, after the start position and the end position are detected, and optionally after the text content tags are added, the browser can extract text content and directly load the text content in a second web page for displaying. Such direct displaying may be a function of the browser that the user can choose to be a default or a selectable feature, without limitation. The user can read the text content by performing the similar or the same methods as depicted in Steps 207-209.

In yet another example, optionally, an extraction button can be displayed. The extraction button can be displayed and configured with appearance and function similar to or the same as the reader button (e.g., as in Step 204). That is, by clicking on the extraction button, the user can request the browser to extract the text content. The extracting of the content can be accomplished using the similar or the same methods as depicted in Steps 205-206. However, the reader button may be replaced by the extraction button, the extraction may be performed by the browser, and the reader may or may not be used. The user can thus read the text content by performing the similar or the same methods as depicted in Steps 207-209.

The displaying of the text content of the first web page can be similar to or the same as the steps depicted in various disclosed embodiments (e.g., Step 207). Thus, the text content of the first web page can be displayed by proceeding to perform Step 207. In this case, the second web page can display the text content similar to or the same as the text content displayed on the second web page as steps depicted in, e.g., Step 207. For example, the text content extracted by a displayed reader (e.g., when the source code corresponding to the first web page contains the article tags) can be the same as the text content extracted within the article tags after adding the article tags (e.g., when the source code corresponding to the first web page does not contain the article tags).

Further, optionally, after the user finishes reading the text content displayed on the second web page, the user can click on the back button. After the browser receives the request command generated by the user by clicking on the back button, the second web page can be closed to return to the first web page.

As disclosed, when source code corresponding to a first web page contains text content tags, text content of the first web page can be extracted by a reader. When the source code corresponding to the first web page does not contain the article tags, the article tags can be added to the text content of the first web page, and the text content of the first web page enclosed within the article tags can be extracted. Thus, the browser can be ensured to be able to extract text content of a web page for displaying. Browsing experience of user(s) can thus be improved.

Figure 5:
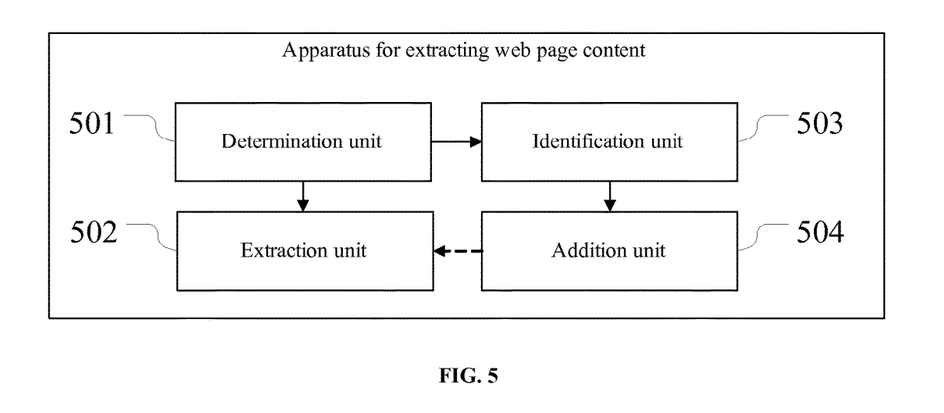
FIG. 5 depicts a structure diagram of an exemplary apparatus for extracting web page content in accordance with various disclosed embodiments.

FIG. 5 depicts a structure diagram of an exemplary apparatus for extracting web page content in accordance with various disclosed embodiments. The apparatus can include a mobile terminal installed with a browser. As shown in FIG. 5, the apparatus can include a determination unit 501, an extraction unit 502, an identification unit 503, and/or an addition unit 504. Certain units may be omitted and other units may be included.

When a request command to open a first web page is received, the determination unit 501 is configured to determine whether a source code corresponding to the first web page contains text content tags. Optionally, a user can open the browser and enter a web address to open the first web page, or directly open the web page (e.g. the first web page) in the browser. The determination unit 501 can receive the request command to open the first web page, open the first web page according to the received request command, and determine whether the source code corresponding to the first web page contains the text content tags.

Optionally, the text content tags can include article tags. That is, the determination unit 501 can determine (i.e., recognize) whether the source code contains article tags therein.

When the source code corresponding to the first web page contains the text content tags, the extraction unit 502 is configured to extract text content of the first web page enclosed within the text content tags using a reader. When the source code corresponding to the first web page does not contain the text content tags, the identification unit 503 is configured to identify a start position and an end position to indicate the text content of the first web page in the source code. Optionally, when the source code is determined not to contain the text content tags, the reader button is not displayed. Thus, the text content of the first web page cannot be read using the reader.

The addition unit 504 is configured to respectively add the text content tags after the start position and before the end position. Accordingly, the extraction unit 502 is further configured to extract the text content of the first web page within the text content tags.

Figure 6:
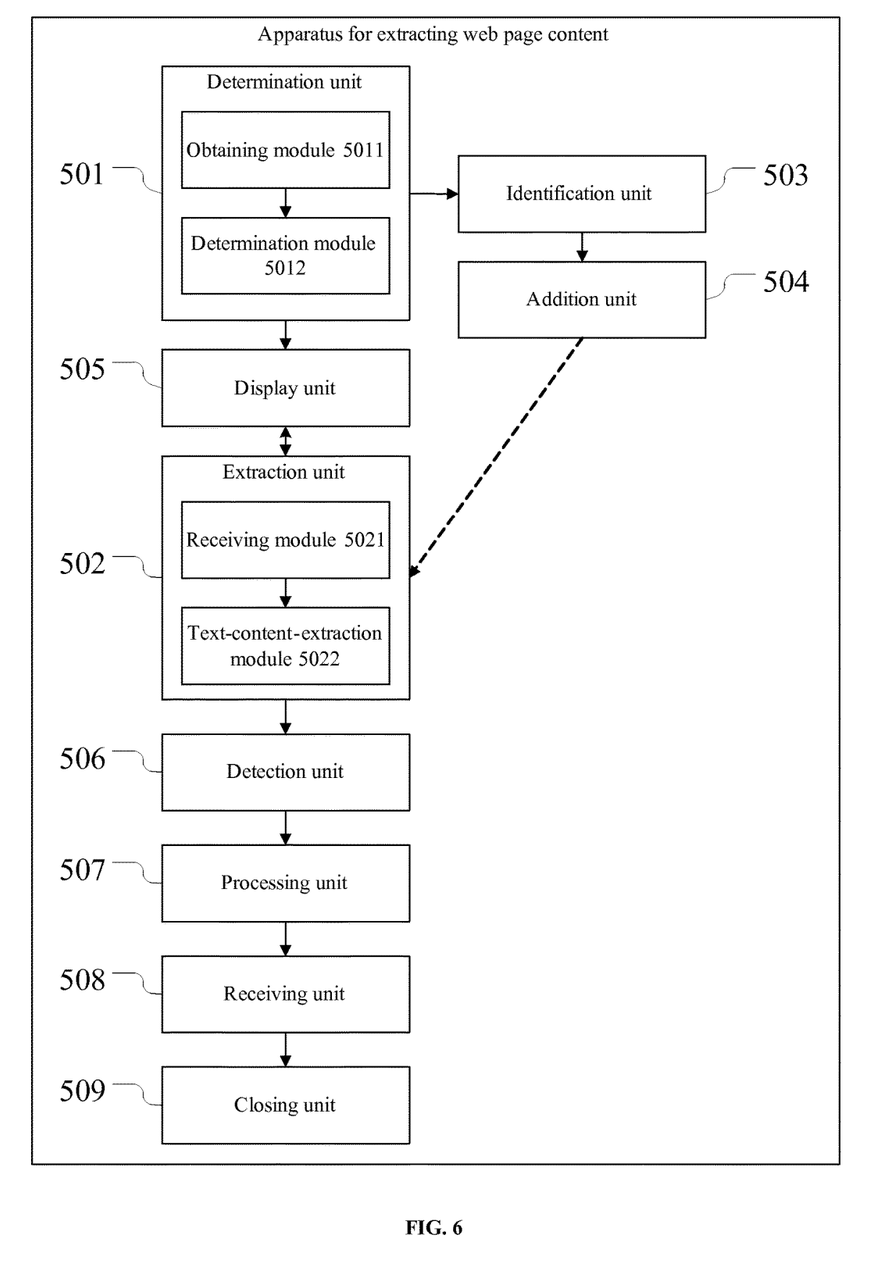
FIG. 6 depicts a structure diagram of another exemplary apparatus for extracting web page content in accordance with various disclosed embodiments.

Further, optionally, FIG. 6 depicts a structure diagram of another exemplary apparatus for extracting web page content in accordance with various disclosed embodiments. The determination unit 501 can include an obtaining module 5011, and/or a determination module 5012. Certain modules may be omitted and other modules may be included.

When the request command to open the first web page is received, the obtaining module 5011 is configured to obtain the source code corresponding to the first web page. The determination module 5012 is configured to determine whether the source code contains the text content tags (e.g., the article tags).

Further, optionally, referring to FIG. 6, the apparatus can further include a display unit 505. When the source code corresponding to the first web page contains the text content tags, the display unit 505 is configured to display a reader button. Optionally, the reader button can be displayed in a browser address bar of the first web page.

Optionally, on a top of a webpage display area, when a web page is being opened, the user may usually pay attention to the browser address bar. The user may conveniently use a reader function (e.g., when the read button is displayed) to read text content of the web page. In various embodiments, the browser address bar can be used to display a title of the text content of the first web page, and the reader button can be displayed after (i.e., following) the title of the text content of the first web page.

The reader button can be set as various forms of identification. For example, the word "reader" can be directly displayed. In one embodiment, the word "reader" can be displayed using a font that is different from the font of other displayed content, e.g., displayed using a bold font. In another example, the reader icon can be set as the word "reader" displayed in a bold box. The reader icon can also be displayed in any other suitable forms in order for the user to easily identify the reader.

Further, optionally, as shown in FIG. 6, the extraction unit 502 can include a receiving module 5021, and/or a text-content-extraction module 5022. Certain modules may be omitted and other modules may be included.

The receiving module 5021 is configured to receive request information to open the reader. When the reader button is displayed on the first web page, it can indicate that the current web page (e.g., the first web page) can be read by the reader. The user may click on the reader button. The receiving module 5021 can receive request information generated by the user via clicking on the reader button. The request information can include the request information to open the reader.

The text-content-extraction module 5022 is configured to open the reader and extract the text content of the first web page enclosed within the text content tags (e.g., the article tags). Optionally, the browser (e.g., the text-content-extraction module 5022) can extract the current web page (e.g., the first web page). That is, the title and the text content of the first web page can be extracted.

For example, when the title is extracted, a title tag reference in the first web page can be obtained using a document object in an html specification. Next, an innerHTML method of the title tag can be called. The title of the first web page can thus be obtained.

For example, when the text content of the first web page is extracted, an article tag reference of the first web page can be obtained using the document object in the html specification. Next, the inner HTML of the article tag can be called. The text content of the first web page can thus be obtained.

Further, optionally, as shown in FIG. 6, after the text-content-extraction module 5022 extracts the text content of the first web page enclosed within the text content tags (e.g., the article tags), the display unit 505 is further configured to display the extracted text content of the first web page on a second web page. In various embodiments, the second web page and the first web page can be different.

Further, optionally, the display unit 505 is further configured such that the second web page displaying the text content of the first web page can be slid upward from e.g., the bottom of the screen, the bottom of the first web page, the lower portion of the screen, etc. In various embodiments, the second web page can display the text content of the first web page. A toolbar can be displayed on a bottom of the second web page, e.g., a toolbar including an icon of changing font, an icon of sharing article content, and/or an icon of returning to the first web page.

Further, optionally, as shown in FIG. 6, when the user browses content of the second web page, the apparatus can further include a detection unit 506, and/or a processing unit 507. For example, when the user reads the text content on the second web page, the user can display other unread pages of the text content using a gesture of sliding upward from e.g., from a lower portion of the screen, or from bottom of the screen, etc. When the last page of the text content is displayed, the detection unit 506 is configured to detect the user's touch operation for continuously sliding the text content upward.

When it is detected that the user (e.g., a finger of the user) is off from the touch screen (e.g., after sliding upward), the processing unit 507 is configured to generate a first animation. The first animation can include an animation bounced back from releasing of a continuous upward pulling of the last page of the text content. Accordingly, the display unit 505 is further configured to display the first animation. Adding the first animation can enhance the user's interest in reading.

Further, optionally, as shown in FIG. 6, the apparatus can further include a receiving unit 508, and/or a closing unit 509. For example, when the user finishes reading the text content displayed on the second web page, the user can click on a back button. Thus, the receiving unit 508 is configured to receive a request command to return to the reader. The closing unit 509 is configured to close the second web page and return to the first web page. Further, the closing unit 509 is configured such that the second page can be slid downward into the first web page e.g., from an upper portion of the screen, or from the top of the screen, etc.

Further, optionally, when the source code corresponding to the first web page does not contain the text content tags, the identification unit 503 is configured to identify the start position and the end position to indicate the text content of the first web page in the source code. After the addition unit 504 respectively adds the text content tags after the start position and before the end position, the extraction unit 502 is configured to extract the text content of the first web page enclosed within the text content tags. The display unit 505 is further configured to display, on a second web page, the extracted text content of the first web page. In various embodiments, the second web page and the first web page can be different.

In the apparatus in accordance with various embodiments, e.g., as shown in FIGS. 5-6, implementation processes of various units and modules, information exchange between the various units and modules, etc., can be similar to or the same as in the methods disclosed above in accordance with various embodiments.

Various embodiments provide an apparatus for extracting web page content. A determination unit can determine whether a source code corresponding to a first web page contains text content tags. When the source code corresponding to the first web page contains the text content tags, an extraction unit can extract text content of the first web page enclosed within the text content tags using a reader. When the source code corresponding to the first web page does not contain the text content tags, the identification unit can identify in the source code a start position and an end position to indicate the text content of the first web page. The addition unit 504 can respectively add the text content tags after the start position and before the end position. Thus, the extraction unit can extract the text content of the first web page enclosed within the text content tags. Therefore, it can be smartly determined whether text content of a web page can be extracted. The text content of the web page can be correctly extracted and displayed. Browsing experience of user(s) can thus be improved.

The apparatus described above according to various embodiments are merely illustrative. The units/modules depicted as separate components may be or may not be physically separated. Components shown as units may be or may not be physical units. That is, they may be located in one place or may be distributed to multiple network units. According to practical needs, part or all of the units/modules can be selected to achieve the purpose according to various embodiments.

The methods and apparatus in accordance with various embodiments can be accomplished using a program/software to instruct related hardware. The hardware can include any suitable universal hardware, or any suitable specialized hardware including, e.g., specialized integrated circuits, specialized central processing unit (CPU), specialized memory, specialized components, etc. For example, the hardware can include personal computer, server, network device, etc. The program/software can be stored in a computer-readable storage medium including, e.g., ROM/RAM, magnetic disk, optical disk, etc. The computer-readable storage medium is non-transitory.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications. Exemplary methods can be implemented by mobile terminals. By using the disclosed methods and apparatus, a request command to open a first web page can be received. It can be determined whether a source code corresponding to the first web page contains text content tags. When the source code corresponding to the first web page is determined to contain the text content tags, text content of the first web page enclosed within the text content tags can be extracted by a reader. When the source code corresponding to the first web page is determined not to contain the text content tags, a start position and an end position to indicate the text content of the first web page can be identified in the source code. The text content tags can be respectively added after the start position and before the end position. The text content of the first web page enclosed within the text content tags can then be extracted.

Thus, whether text content of a web page can be extracted can be smartly determined. The text content of the web page can be correctly extracted and displayed. Browsing experience of user(s) can thus be improved.

What is claimed is:

1. A method for extracting web page content, implemented by a mobile terminal, comprising:
    receiving a request command to open a first web page;
    determining whether a source code corresponding to the first web page contains text content tags; and
    when the source code corresponding to the first web page is determined to contain the text content tags: extracting text content of the first web page enclosed within the text content tags by a reader; or
    when the source code corresponding to the first web page is determined not to contain the text content tags:
        identifying in the source code a start position and an end position to indicate the text content of the first web page;
        respectively adding the text content tags after the start position and before the end position; and
        extracting the text content of the first web page enclosed within the text content tags,
    wherein, the method further comprises:
        before extracting the text content of the first web page, extracting a title of the text content of the first webpage; and
        simultaneously displaying the title and a reader button in a browser address bar of the first webpage, wherein the text content of the first web page is extracted in response to the reader button being triggered.

2. The method according to claim 1, wherein the text content tags include article tags.

3. The method according to claim 2, wherein the determining of whether the source code corresponding to the first web page contains the text content tags includes:
    obtaining the source code corresponding to the first web page, when receiving the request command to open the first web page; and
    determining, by a rendering engine of a browser installed in the mobile terminal, whether the source code contains the article tags.

4. The method according to claim 2, wherein the extracting of the text content of the first web page enclosed within the text content tags by the reader includes:
    receiving request information to open the reader; and
    opening the reader to extract the text content of the first web page enclosed within the article tags.

5. The method according to claim 4, further including:
    displaying the extracted text content of the first web page on a second web page, the second web page being different from the first web page.

6. The method according to claim 5, wherein the text content is displayed on a touch screen, the method further including:
    when a last page of the text content is displayed, detecting a touch operation for continuously sliding the text content upward by a user; and
    when the user is detected to be off from the touch screen, generating and displaying a first animation, the first animation including an animation bounced back from releasing of a continuous upward pulling of the last page of the text content.

7. The method according to claim 5, wherein, after the displaying of the extracted text content of the first web page on the second web page, the method further includes:
    receiving a request command to return to the reader; and
    closing the second web page.

8. The method according to claim 7, wherein:
    the displaying of the extracted text content of the first web page on the second web page includes sliding upward the second web page displaying the text content of the first web page; and
    the closing of the second web page includes sliding the second web page downward into the first web page.

9. An apparatus for extracting web page content, comprising: a memory, and a processor coupled to the memory, the processor being configured to:

when a request command to open a first web page is received, determine whether a source code corresponding to the first web page contains text content tags; and
when the source code corresponding to the first web page is determined to contain the text content tags:
extract text content of the first web page enclosed within the text content tags by a reader; or
when the source code corresponding to the first web page is determined not to contain the text content tags:
identify a start position and an end position to indicate the text content of the first web page in the source code;
respectively add the text content tags after the start position and before the end position; and
extract the text content of the first web page enclosed within the text content tags,
wherein the processor is further configured to:
before extracting the text content of the first web page, extract a title of the text content of the first webpage; and
simultaneously display the title and a reader button in a browser address bar of the first webpage, wherein the text content of the first web page is extracted in response to the reader button being triggered.

10. The system according to claim 9, wherein the text content tags include article tags.

11. The system according to claim 10, wherein the processor is further configured to:
obtain the source code corresponding to the first web page, when the request command to open the first web page is received; and
determine, by a rendering engine of a browser installed in the mobile terminal, whether the source code contains the text content tags.

12. The system according to claim 10, wherein the processor is further configured to:
receive request information to open the reader; and
open the reader to extract the text content of the first web page enclosed within the text content tags.

13. The system according to claim 12, wherein the processor is further configured to:
display the extracted text content of the first web page on a second web page, the second web page being different from the first web page.

14. The system according to claim 13, wherein the text content is displayed on a touch screen, and the processor is further configured to:
detect a touch operation for continuously sliding the text content upward by a user, when a last page of the text content is displayed; and
when the user is detected to be off from the touch screen, generate a first animation for displaying, the first animation including an animation bounced back from releasing of a continuous upward pulling of the last page of the text content,
display the first animation.

15. The system according to claim 13, wherein the processor is further configured to:
receive a request command to return to the reader; and
close the second web page.

16. The system according to claim 15, wherein the processor is further configured to:
slide upward the second web page displaying the text content of the first web page; and
slide the second web page downward into the first web page.

17. The method according to claim 1, wherein simultaneously displaying the title and the reader button in the browser address bar further comprising:
displaying, in a first space of the browser address bar, a preset number of characters in the title; and
displaying, in a remaining space of the browser address bar, the reader button.

18. The method according to claim 1, further comprising:
when the title is being extracted, obtaining a title tag reference of the first webpage using a document object in an html specification; and
calling an innerHTML method of the title tag to obtain the title of the text content of the first webpage.

19. The method according to claim 1, further comprising:
locally saving a standard html page as a reader template page in a browser, a structure of the reader template page including a title portion and a text content portion; and
after the title and the text content are extracted, inserting the title and the text content into corresponding portions in the reader template page.

* * * * *